(12) United States Patent
Kim et al.

(10) Patent No.: US 11,611,080 B2
(45) Date of Patent: Mar. 21, 2023

(54) SILICON ELECTRODE BINDER

(71) Applicant: LG CHEM, LTD., Seoul (KR)

(72) Inventors: Kyung Oh Kim, Daejeon (KR); Jeong Ae Yoon, Daejeon (KR); Sung Soo Yoon, Daejeon (KR); Jang Bae Kim, Daejeon (KR); Su Jee Kwon, Daejeon (KR); Jong Hyun Chae, Daejeon (KR); Jong Heon Kwak, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 463 days.

(21) Appl. No.: 16/647,342

(22) PCT Filed: Sep. 17, 2018

(86) PCT No.: PCT/KR2018/010897
§ 371 (c)(1),
(2) Date: Mar. 13, 2020

(87) PCT Pub. No.: WO2019/054816
PCT Pub. Date: Mar. 21, 2019

(65) Prior Publication Data
US 2021/0028461 A1 Jan. 28, 2021

(30) Foreign Application Priority Data
Sep. 15, 2017 (KR) .......................... 10-2017-0118738

(51) Int. Cl.
*H01M 4/62* (2006.01)
*C08F 220/28* (2006.01)
(Continued)

(52) U.S. Cl.
CPC ........... *H01M 4/622* (2013.01); *C08F 220/06* (2013.01); *C08F 220/281* (2020.02);
(Continued)

(58) Field of Classification Search
CPC ................ C08F 220/281; C08F 220/42; C08F 220/06; H01M 4/622
See application file for complete search history.

(56) References Cited

U.S. PATENT DOCUMENTS 8,709,651 B2 * 4/2014 Kim ...................... H01M 4/133
429/66
9,461,308 B2 * 10/2016 Sasaki ..................... H01M 4/13
(Continued)

FOREIGN PATENT DOCUMENTS

| CN | 102939676 A | 2/2013 |
|----|-------------|--------|
| CN | 102959773 A | 3/2013 |

(Continued)

OTHER PUBLICATIONS

European Office Action for European Application No. 18 857 035.2, dated Mar. 31, 2021.
(Continued)

*Primary Examiner* — Amanda C. Walke
(74) *Attorney, Agent, or Firm* — Birch, Stewart, Kolasch & Birch, LLP

(57) ABSTRACT

The present application relates to a binder. The present application can provide a binder which can be applied to production of silicon series negative electrodes to cope well with shrinkage and expansion by repeated charge and discharge, and has excellent binding force between active materials and adhesive force to a current collector, and an active material composition, an electrode and a secondary battery, comprising the same.

13 Claims, 1 Drawing Sheet

(51) Int. Cl.
    *H01M 4/134*     (2010.01)
    *H01M 4/38*     (2006.01)
    *H01M 10/0525*     (2010.01)
    *C08F 220/06*     (2006.01)
    *C08F 220/42*     (2006.01)
    *H01M 4/02*     (2006.01)

(52) U.S. Cl.
    CPC ........... *C08F 220/42* (2013.01); *H01M 4/134* (2013.01); *H01M 4/386* (2013.01); *H01M 10/0525* (2013.01); *C08F 2800/20* (2013.01); *H01M 2004/027* (2013.01)

(56) References Cited

U.S. PATENT DOCUMENTS

| | | | | |
|---|---|---|---|---|
| 9,543,584 | B2 * | 1/2017 | Kim | .................. C08F 212/36 |
| 9,887,423 | B2 * | 2/2018 | Kang | .................. C09D 133/08 |
| 10,224,549 | B2 * | 3/2019 | Sasaki | ............... C08F 220/1804 |
| 2006/0058462 | A1 | 3/2006 | Kim et al. | |
| 2015/0125746 | A1 | 5/2015 | Sonobe et al. | |
| 2018/0108912 | A1 | 4/2018 | Kang et al. | |

FOREIGN PATENT DOCUMENTS

| | | | | |
|---|---|---|---|---|
| CN | 104321913 | A | | 1/2015 |
| CN | 104380504 | A | | 2/2015 |
| CN | 104781953 | A | | 7/2015 |
| CN | 105074977 | A | | 11/2015 |
| CN | 105794028 | A | | 7/2016 |
| CN | 105900271 | A | | 8/2016 |
| CN | 106233514 | A | | 12/2016 |
| CN | 106866846 | A | * 6/2017 | ............. C08B 11/12 |
| JP | 2012-51999 | A | | 3/2012 |
| JP | 2012-204303 | A | | 10/2012 |
| JP | 2014-35900 | A | | 2/2014 |
| JP | 2015-106488 | A | | 6/2015 |
| KR | 10-2008-0034219 | A | | 4/2008 |
| KR | 10-1161145 | B1 | | 6/2012 |
| KR | 10-1532545 | B1 | | 6/2015 |
| KR | 10-2016-0148853 | A | | 12/2016 |
| KR | 10-2017-0076298 | A | | 7/2017 |
| WO | WO 2015/008626 | A1 | | 1/2015 |
| WO | WO 2015/133423 | A1 | | 9/2015 |

OTHER PUBLICATIONS

Fedelich et al., "Thermal Analysis of Polymers", Mettler Toledo, Jan. 1. 2013, pp. 1-40, XP055608279, URL:https://www.mt.com/dam/LabDiv/guides-glen/ta-polymer/TA_Polymers_Selected_Apps_EN.pdf.

Extended European Search Report for European Application No. 18857035.2 dated Jun. 30, 2020.

European Office Action dated Sep. 28, 2021 for Application No. 18 857 035.2.

International Search Report (PCT/ISA/210) issued in PCT/KR2018/010897, dated Feb. 11, 2019.

\* cited by examiner

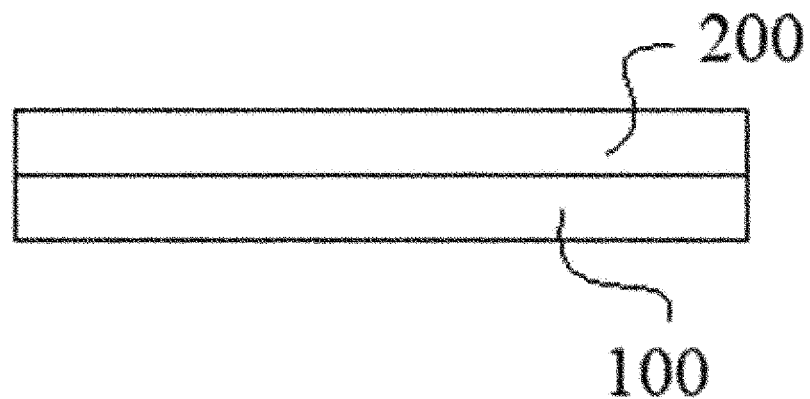

SILICON ELECTRODE BINDER

CROSS REFERENCE TO RELATED APPLICATIONS

This application claims priority from Korean Patent Application No. 10-2017-0118738 filed on Sep. 15, 2017, the disclosure of which is incorporated herein by reference in its entirety.

TECHNICAL FIELD

The present application relates to a silicon electrode binder.

BACKGROUND ART

Secondary batteries such as lithium ion secondary batteries are being used variously as they can be manufactured to be lightweight while being compact, have a high energy density and can be repeatedly charged and discharged, and research is also being made to improve the performance of the secondary batteries.

For example, there is an attempt to increase the capacity by adopting a silicon negative electrode active material as a negative electrode active material. However, the silicon series active material has a high theoretical capacity, but it repeatedly expands and shrinks largely during charging and discharging, whereby there is a problem that the active material deteriorates over time, the electrode plate structure is destroyed and the conductive path in the electrode is damaged.

DISCLOSURE

Technical Problem

The present application relates to a silicon negative electrode binder. The present application can provide a binder which can be applied to production of silicon series negative electrodes to cope well with shrinkage and expansion by repeated charge and discharge, and has excellent binding force between active materials and adhesive force to a current collector.

Technical Solution

The present application relates to a silicon negative electrode binder. The term silicon negative electrode binder means a binder used in production of silicon series negative electrodes.

The binder of the present application comprises a copolymer. The copolymer may be a block copolymer, a gradient copolymer or a random copolymer, and in one example, it may be a random copolymer.

By using a copolymer having a monomer composition to be described below as a silicon negative electrode binder, the present application can effectively cope with repeated shrinkage and expansion according to charge and discharge of a secondary battery, and secure binding force between active materials and excellent adhesive force to a current collector.

The copolymer comprises a rigid unit and an elastic unit, to which appropriate functional groups are introduced, and further comprises a unit of a hydrophobic monomer.

In one example, the copolymer may comprise a first monomer unit having a glass transition temperature of a homopolymer of 80° C. or higher and a second monomer unit having the glass transition temperature of a homopolymer of 70° C. or lower. In this specification, the "glass transition temperature" of a homopolymer of a monomer unit may be the glass transition temperature measured in the polymer (homopolymer), in which only the monomers of the unit are polymerized, or calculated with the monomer. Unless otherwise specified, a glass transition temperature of a monomer or a glass transition temperature of a monomer unit, as mentioned herein, is the glass transition temperature of the homopolymer of the monomer as described above.

In addition, the term unit of a certain monomer means a state where the relevant monomer undergoes polymerization reaction to form a main chain or side chain of a polymer.

The glass transition temperature of the first monomer unit may be, for example, 85° C. or higher, 90° C. or higher, 95° C. or higher, or 100° C. or higher. The upper limit of the glass transition temperature of the first monomer unit is not particularly limited, but for example, the glass transition temperature of the first monomer unit may be 200° C. or lower, 190° C. or lower, 180° C. or lower, 170° C. or lower, 160° C. or lower, 150° C. or lower, 140° C. or lower, 130° C. or lower, 120° C. or lower, or 110° C. or lower or so.

The glass transition temperature of the second monomer unit may be, for example, 65° C. or lower, 60° C. or lower, 55° C. or lower, 50° C. or lower, 45° C. or lower, 40° C. or lower, 35° C. or lower, 30° C. or lower, 25° C. or lower, 20° C. or lower, 15° C. or lower, 10° C. or lower, 5° C. or lower, 0° C. or lower, −5° C. or lower, −10° C. or lower, −15° C. or lower, −20° C. or lower, −25° C. or lower, −30° C. or lower, −35° C. or lower, −40° C. or lower, −45° C. or lower, −50° C. or lower, or −55° C. or lower. The lower limit of the glass transition temperature of the second monomer unit is not particularly limited, and for example, the glass transition temperature of the second monomer unit may be about −200° C. or higher, −190° C. or higher, −180° C. or higher, −170° C. or higher, −160° C. or higher, −150° C. or higher, −140° C. or higher, −130° C. or higher, −120° C. or higher, −110° C. or higher, −100° C. or higher, −90° C. or higher, −80° C. or higher, or −70° C. or higher.

Here, the first and second monomers are distinguished from a hydrophobic monomer to be described below, and for example, both of their aqueous solubility may exceed 5%.

In one example, the aqueous solubility of the homopolymer of the first monomer unit may be about 10% or more, about 15% or more, about 20% or more, about 25% or more, about 30% or more, about 35% or more, about 40% or more, about 45% or more, about 50% or more, about 55% or more, about 60% or more, about 65% or more, about 70% or more, about 75% or more, about 80% or more, about 85% or more, about 90% or more, or about 95% or more or so. In another example, the aqueous solubility of the homopolymer of the first monomer unit may be about 100% or so.

In addition, the aqueous solubility of the homopolymer of the second monomer unit exceeds 5%, as mentioned above, and simultaneously, may be about 45% or less, about 40% or less, about 35% or less, about 30% or less, about 25% or less, or about 20% or less. In another example, the aqueous solubility of the homopolymer of the second monomer may be about 5.5% or more, about 6% or more, about 6.5% or more, about 7% or more, about 7.5% or more, about 8% or more, about 8.5% or more, about 9% or more, about 9.5% or more, or about 10% or more.

The copolymer comprising the first and second monomer units having a glass transition temperature within the above range can simultaneously realize appropriate rigidity and elasticity.

The ratio of the first monomer unit in the copolymer is not particularly limited as long as it can be adjusted in consideration of rigidity or the like of the desired binder. In one example, the first monomer unit may be included in a ratio of 10 to 40 weight % based on the total weight of the copolymer. In another example, the ratio of the first monomer unit may be 15 weight % or more, or 20 weight % or more, or may be 35 weight % or less or so.

Also, the ratio of the second monomer unit is not particularly limited as long as it can be adjusted in consideration of elasticity or the like of the desired binder. In one example, the second monomer unit may be about 100 to 500 parts by weight or so based on 100 parts by weight of the first monomer unit. In another example, the ratio of the second monomer unit may be 150 parts by weight or more, or 200 parts by weight or more, or may be 450 parts by weight or less, or 400 parts by weight or less or so.

The copolymer may be an acrylic copolymer. The term acrylic copolymer is a copolymer containing an acrylic monomer unit as a main component. Also, the fact of being included as a main component is a case where the weight ratio of the relevant component is about 55 weight % or more, 60 weight % or more, 65 weight % or more, 70 weight % or more, 75 weight % or more, 80 weight % or more, 85 weight % or more, or 90 weight % or more, based on the total weight. Here, the upper limit of the ratio of the main component is not particularly limited, which may be about 100 weight % or so.

In addition, the term acrylic monomer means acrylic acid, methacrylic acid or a derivative thereof, such as an acrylic acid ester or a methacrylic acid ester.

In one example, as the first monomer unit, a monomer unit having a carboxyl group can be used.

As the monomer having a carboxyl group, a known component can be used without particular limitation, and for example, (meth)acrylic acid, 2-(meth)acryloyloxyacetic acid, 3-(meth)acryloyloxypropionic acid, 4-(meth)acryloyloxybutyric acid, acrylic acid dimer, itaconic acid, maleic acid and maleic anhydride, and the like can be used, without being limited thereto. In one example, acrylic acid can be applied.

In one example, the second monomer unit may be a monomer unit having a hydroxyl group, a polyalkylene oxide unit-containing monomer unit, a phosphite group-containing monomer unit or a ureido group-containing monomer unit.

The specific kind of the monomer that can be applied in this case is not particularly limited, and a suitable kind may be used in consideration of the glass transition temperature of the monomer.

For example, the hydroxyl group-containing monomer may be hydroxyalkyl (meth)acrylate or N-hydroxyalkylacrylamide.

In addition, as the polyalkylene oxide unit-containing monomer, for example, a monomer represented by Formula 1 below can be used.

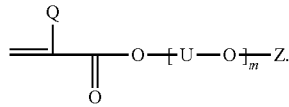

[Formula 1]

In Formula 1, Q is hydrogen or an alkyl group, U is an alkylene group or an alkylidene group, Z is hydrogen or an alkyl group, and m is an arbitrary number.

In this specification, the term alkyl group means a linear, branched or cyclic alkyl group having 1 to 20 carbon atoms, 1 to 16 carbon atoms, 1 to 12 carbon atoms, 1 to 8 carbon atoms, or 1 to 4 carbon atoms, which may be optionally substituted, unless otherwise specified.

Also, in this specification, the term alkylene group or alkylidene group may be exemplified by an alkylene group or an alkylidene group having 1 to 20 carbon atoms, 1 to 16 carbon atoms, 1 to 12 carbon atoms, 1 to 8 carbon atoms, or 1 to 4 carbon atoms. The alkylene group or alkylidene group may be linear, branched or cyclic. The alkylene group or alkylidene group may be optionally substituted with one or more substituents.

In the Formula 1, m is an arbitrary number, which may be, for example, each independently a number in a range of 1 to 100, 1 to 90, 1 to 80, 1 to 70, 1 to 60, 1 to 50, 1 to 40, 1 to 30, 1 to 20, 1 to 16, or 1 to 12.

In one example, a compound, wherein in Formula 1 above, Q is hydrogen or an alkyl group having 1 to 4 carbon atoms, U is an alkylene group having 1 to 4 carbon atoms, Z is hydrogen or an alkyl group having 1 to 4 carbon atoms, and m is 1 to 30 or so, can be used as the second monomer, without being limited thereto.

Furthermore, the monomer having a phosphite group can be exemplified by ethylene glycol acrylate phosphite or 4-hydroxybutyl acrylate phosphite, and the like, and the monomer having an ureido group can be exemplified by ureido (meth)acrylate, and the like, without being limited thereto.

The copolymer may further comprise a unit of a hydrophobic monomer in addition to the first and second monomer units. In the present application, the term hydrophobic monomer means a monomer having aqueous solubility of less than 5%. In another example, the aqueous solubility of the monomer may be about 4.5% or less, about 4% or less, about 3.5% or less, about 3% or less, about 2.5% or less, about 2% or less, about 1.5% or less, or about 1% or less or so. In another example, the aqueous solubility may be about 0% or more, or about 0.1% or more, about 0.2% or more, about 0.3% or more, about 0.4% or more, or about 0.5% or more.

In the present application, the term aqueous solubility of a monomer may be the aqueous solubility of the monomer itself or may mean the aqueous solubility of the homopolymer prepared using the monomer, which is measured in the manner set forth in Examples.

In describing physical properties herein, when the measured temperature affects relevant physical properties, the relevant physical properties are physical properties measured at room temperature, unless otherwise specified. The term room temperature is a natural temperature without warming or cooling, and for example, is any one temperature in a range of 10° C. to 30° C., or a temperature of about 23° C. or about 25° C. or so.

In one example, the hydrophobic monomer can be exemplified by (meth)acrylonitrile, styrene or a styrene-based monomer such as alkyl styrene, or alkyl (meth)acrylate, and the like. Here, the alkyl group can be exemplified by a linear, branched or cyclic alkyl group having 1 to 20 carbon atoms, 1 to 16 carbon atoms, 1 to 12 carbon atoms, 1 to 8 carbon atoms, or 1 to 4 carbon atoms. The unit of such a hydrophobic monomer can contribute to excellent binding force to an active component and excellent adhesive force to a current collector exhibited by the binder.

The ratio of the third monomer unit is not particularly limited as long as it can be adjusted in consideration of the binding property and the adhesive property of the desired binder. In one example, the third monomer unit may be about 0.1 to 30 parts by weight or so based on 100 parts by weight of the total of the first and second monomer units. In another example, the ratio of the third monomer unit may be 0.5 part by weight or more, 1 part by weight or more, 2 parts by weight or more, 3 parts by weight or more, 4 parts by weight or more, or 5 parts by weight or more, or may be 25 parts by weight or less, 20 parts by weight or less, or 15 parts by weight or less or so.

The copolymer may comprise only the first to third monomer units as the monomer units, or may further comprise other units in addition to the units, if necessary. In addition, the shape thereof may be various shapes such as a linear shape, a branched shape, or a stellate shape.

For example, in the copolymer, a nitrogen-containing monomer unit such as (meth)acrylamide, N-methyl (meth) acrylamide, N-butoxymethyl (meth)acrylamide, N-vinylpyrrolidone or N-vinylcaprolactam; a glycidyl group-containing monomer unit such as glycidyl (meth)acrylate; or a carboxylic acid vinyl ester unit such as vinyl acetate, and the like can be exemplified, without being limited thereto.

The copolymer may exhibit aqueous solubility of about 5% or more. The aqueous solubility can be measured according to the method disclosed in Examples.

The copolymer may have a weight average molecular weight in a range of 100,000 to 5,000,000. The weight average molecular weight mentioned herein can be measured using, for example, GPC (gel permeation chromatograph), and unless otherwise specified herein, the molecular weight of the copolymer means the weight average molecular weight. In another example, the weight average molecular weight may be 150,000 or more, or 200,000 or more, or may be 4,500,000 or less, 4,000,000 or less, 3,500,000 or less, or 3,000,000 or less or so.

The copolymer may have a molecular weight distribution (PDI; Mw/Mn), that is, a ratio (Mw/Mn) of a weight average molecular weight (Mw) to a number average molecular weight (Mn), in a range of 2 to 10 or so.

Such a copolymer can be prepared based on general copolymer preparation methods known in the art.

The present application also relates to a silicon electrode binder composition. The composition may comprise at least the above-described copolymer or a binder having the same, and may further comprise other components. For example, the binder composition may comprise a cross-linking component capable of cross-linking the copolymer. Such a cross-linking component can be selected, for example, to form a cross-linking structure in which the copolymer can adequately represent the desired physical properties.

Here, the kind of the applied cross-linking component is not particularly limited, which may be selected according to a known method.

For example, when the polymer contains a cross-linkable functional group such as a hydroxyl group, a urethane cross-linking method applying a cross-linking agent such as an isocyanate cross-linking agent may be applied. At this time, the cross-linking agent may be exemplified by a diisocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a compound obtained by reacting the diisocyanate compound with a polyol (e.g., trimethylolpropane), and the like. Alternatively, after some or all of the hydroxyl groups are transformed to radical reactive groups such as (meth)acryloyl groups by applying a material such as isocyanatoalkyl (meth)acrylate, a method of implementing a cross-linked structure through a radical reaction or the like can be used.

Such a cross-linked structure can be imparted so that appropriate elasticity can be imparted to the binder by ensuring an appropriate cross-linking degree. For example, the cross-linking degree can be imparted such that the gel fraction calculated by the distilled water extraction residue fraction is in a range of 10 to 30%. Such a cross-linking degree (gel fraction) can be achieved by adjusting the type or ratio of the cross-linking agent to be applied, the kind or ratio of the cross-linking functional group, or the cross-linking conditions.

The gel fraction can be specifically determined according to Equation 1 below.

$$\text{Gel fraction (\%)}=B/A\times100 \qquad \text{[Equation 1]}$$

In Equation 1, A is the mass of the block copolymer, and B represents the dry mass of the insoluble fraction collected after the block copolymer having the mass A in a state of being placed in a net having a size of 200 meshes is immersed in distilled water at room temperature for 72 hours.

A binder suitable for the purpose of the present application can be realized by maintaining the gel fraction in the above range.

Here, the room temperature is a natural temperature without warming or cooling, and for example, is any one temperature in a range of 10° C. to 30° C., or a temperature of about 23° C. or about 25° C. or so.

Also, here, the dry mass means a state where the collected insoluble fraction is subjected to a proper drying process so that the relevant insoluble fraction does not substantially contain a solvent (ethyl acetate, etc.), and for example, means a state where the amount of the solvent is about 1 weight % or less, 0.5 weight % or less, 0.1 weight % or less, or 0.05 weight % or less. The drying condition to be applied for this purpose is not particularly limited, which can be adjusted so that the solvent amount as above can be achieved.

The silicon electrode binder composition may be the copolymer itself, or may comprise other known additives or binders while comprising the copolymer.

Here, the applicable additive may be exemplified by a solvent, such as an aqueous solvent such as water, an organic solvent or a mixed solvent of two or more kinds, a thickener, a conductive material, a reinforcing material, a leveling agent or an electrolyte additive, and the like.

The present application also relates to a silicon electrode active material composition. The active material composition may be, for example, a silicon negative electrode active material composition.

The active material composition may comprise an electrode (for example, a negative electrode) active material and the binder, where the active material may comprise a silicon negative electrode active material. By using such an active material composition, the productivity of the electrode can be improved and the secondary battery can exhibit excellent cycle characteristics and storage stability. The ratio of the binder in the composition may be about 0.05 to 10 weight % or so based on the solid content. Also, here, the solid content is a state where a solvent such as an organic solvent or an aqueous solvent is not substantially included, and for example, a case where the ratio of the solvent is 5 weight % or less, 4 weight % or less, 3 weight % or less, 2 weight % or less, 1 weight % or less, or 0.5 weight % or less, or 0 weight %.

The composition basically comprises the binder and the active material, and may comprise a solvent or other components (thickener and the like), if necessary.

The electrode active material, for example, the negative electrode active material is a material capable of transferring electrons from the negative electrode of a secondary battery, for example, a lithium secondary battery. For example, as a negative electrode active material of a lithium ion secondary battery, a material capable of absorbing and desorbing lithium is generally used. The composition of the present application comprises at least a silicon negative electrode active material as an active material.

The silicon negative electrode active material may include silicon (Si), an alloy containing silicon, SiO, $SiO_2$, SiOx, a composite material of a Si-containing material with conductive carbon formed by coating or compounding the Si-containing material with the conductive carbon, and the like. These silicon negative electrode active materials may be used alone or in combination of two types.

Here, the alloy containing silicon can be exemplified by, for example, an alloy composition comprising silicon and at least one element selected from the group consisting of titanium, iron, cobalt, nickel and copper. In addition, as the alloy containing silicon, for example, an alloy composition containing silicon, aluminum and a transition metal such as iron, and tin and a rare earth element such as tin and yttrium can also be used.

SiOx may be a compound containing Si and at least one of SiO and $SiO_2$, wherein x is generally in a range of 0.01 or more to less than 2. SiOx can be formed, for example, by using a disproportionation reaction of SiO. Specifically, SiOx can be prepared by heat-treating SiO in the presence of a polymer such as polyvinyl alcohol optionally to produce silicon and silicon dioxide. The heat treatment may be performed at a temperature of, for example, 900° C. or higher or 1000° C. or higher under an atmosphere containing organic gas and/or vapor after the silica and the polymer are pulverized and mixed.

The composite material of the Si-containing material and the conductive carbon may include, for example, a compound obtained by heat-treating a pulverized mixture of SiO and a polymer such as polyvinyl alcohol with optionally a carbon material under an atmosphere containing organic gas and/or vapor. Furthermore, the composite material may also be obtained by a known method such as a method of coating the surface for particles of SiO with a chemical vapor deposition method using organic gas or the like or a method of performing composite atomization (granulation) of particles of SiO and graphite or artificial graphite with a mechanochemical method.

From the viewpoint of high capacity, the above-described silicon-containing alloy and SiOx can be used as the silicon negative electrode active material.

For example, the active material may be contained, typically, in a ratio of 90 to 97 parts by weight relative to 100 parts by weight of the binder.

Also, in the composition, as the active material, the silicon material and other known carbon-based negative electrode active materials and/or metal-based negative electrode active materials, and the like may be used in combination.

Other components that can be included in the active material composition can be exemplified by a solvent, a thickener, a conductive material, a reinforcing material, a leveling agent or an electrolyte additive, and the like, but are not limited thereto.

The active material composition may be prepared by mixing the respective components in a known manner without any particular limitation.

For example, the composition can be prepared by adding an appropriate dispersion medium to the respective components, if necessary, and mixing them, and for example, can be prepared by mixing the respective components using a mixer such as a ball mill, a sand mill, a bead mill, a pigment dispersing machine, an ultrasonic dispersing machine, a homogenizer, a planetary mixer or a fill mix.

The present application also relates to a silicon electrode for a secondary battery, for example, a silicon negative electrode for a secondary battery. The electrode can be used, for example, in a lithium secondary battery.

For example, the silicon electrode is equipped with a current collector and an electrode active layer formed on the current collector, where the electrode active layer comprises at least a silicon electrode active material and the binder. The respective components contained in the electrode active layer are those included in the active material composition, and their specific examples or ratios, and the like are based on the above-mentioned contents. The FIGURE shows a case where the electrode active layer (200) is formed on the current collector (100).

The electrode can be produced, for example, according to a known method in which the above-mentioned active material composition is applied on a current collector, dried and, if necessary, rolled.

Here, the method for applying the composition on the current collector is not particularly limited and known methods can be used. Specifically, as the application method, a doctor blade method, a dipping method, a reverse roll method, a direct roll method, a gravure method, an extrusion method, a brushing method, or the like can be used. Such application may be performed only on one side of the current collector, or may be performed on both sides, and as the thickness of such a coating, a known thickness may be applied.

Here, as the current collector, a material having electric conductivity and electrochemical durability is used. In general, as the current collector, for example, iron, copper, aluminum, nickel, stainless steel, titanium, tantalum, gold, copper foil or platinum, and the like is used, and such a material may be used alone or in combination of two or more thereof.

The present application also relates to a secondary battery comprising the electrode, for example, a lithium ion secondary battery having the silicon electrode as a negative electrode.

The configuration of such a secondary battery is not particularly limited, and it may have a known configuration as long as it comprises the electrode.

For example, in a general configuration including a positive electrode, a negative electrode, an electrolyte and a separator, the lithium ion secondary battery may comprise the silicon electrode as the negative electrode.

Specific types of the respective components included in the secondary battery, for example, the positive electrode, the electrolyte, the separator, and the like or the method of forming the secondary battery using the same are not particularly limited, and a known method can be applied.

Advantageous Effects

The present application can provide a binder which can be applied to production of silicon series negative electrodes to cope well with shrinkage and expansion by repeated charge and discharge, and has excellent binding force between active materials and adhesive force to a current collector, and an active material composition, an electrode and a secondary battery, comprising the same.

BRIEF DESCRIPTION OF DRAWINGS

The FIGURE is an exemplary schematic diagram of an electrode of the present application.

MODE FOR INVENTION

Hereinafter, the device and method will be described in detail by way of Examples and Comparative Examples, but the scope of the device and method is not limited by the following examples.

1. Evaluation of molecular weight

The weight average molecular weight (Mw) and the molecular weight distribution (PDI) were measured using GPC (gel permeation chromatograph) under the following conditions, and the measurement results were converted using standard polystyrene of Agilent system for production of calibration curves.

<Measurement Conditions>
Measuring instrument: Agilent GPC (Agilent 1200 series, U.S.)
Column: PLGel-M, PLGel-L serial connection
Column temperature: 35° C.
Eluent: THF (tetrahydrofuran)
Flow rate: 1.0 mL/min
Concentration: ~1 mg/mL (100 μL injection)

2. Polymer conversion rate and NMR evaluation

The conversion rate was calculated according to Equation 1 below by applying integral values of a signal by a monomer and a signal by a polymer in the spectrum obtained by NMR analysis.

The NMR analysis was performed at room temperature using an Agilent 500 MHz instrument, where an analyte (a polymerized reactant and the like) was diluted in a measuring solvent ($CDCl_3$ and $D_2O$) to a concentration of about 10 mg/ml or so and used, and a chemical shift was expressed in ppm.

Conversion rate (%)=100×polymer signal integral value/(polymer signal integral value+monomer signal integral value) [Equation 1]

3. Solubility measurement method

The solubility was evaluated by taking 1 g of the solubility measurement object (polymer or monomer), adding it to 5 g of water, stirring it at room temperature (25° C.) for 30 minutes, and then removing undissolved residual solute. The amount of the solute dissolved in the solvent was measured by measuring the removed residual solute, and the solubility was evaluated by converting the measured amount into the value for 100 g of the solvent. Here, the removal of the residual solute was performed by filtering the solution out by a sieve with a pore size of about 0.45 μm or so.

The aqueous solubility was calculated as a percentage of the amount of the solute dissolved in the solvent based on the weight (aqueous solubility=100×B(B+A), where B is the weight (unit: g) of the solute and A is the weight (unit: g) of the solvent).

In addition, the polymer solubility described in Table 1 below was measured in the above manner for the polymer itself prepared in each of Examples or Comparative Examples, and the aqueous solubility of the homopolymer of the monomer was measured for the homopolymer itself prepared by the method disclosed in the following example except for applying only the monomer to the method disclosed in the following example.

4. Adhesive force measurement

A specimen was prepared by stamping the prepared negative electrode to a width of about 1.5 cm and a height of about 12 cm. Subsequently, a double-sided tape is attached on glass of a glass slide, a back surface of a 3M adhesive tape is attached on the double-sided tape, and the slurry surface of the stamped negative electrode is attached on the adhesive tape to obtain a measurement sample. Thereafter, one end of the negative electrode attached on the glass is peeled off about 0.5 cm and fixed to the lower clamp of a texture analyzer, and the other part of the drooping negative electrode is fixed with the upper clamp, and then pulled with a force of about 2 gf to measure the force at the time when the negative electrode slurry drops.

5. Maximum particle size measurement

The maximum particle size was measured using a plate on which micropores with different sizes ranging from 1 μm to 100 μm are formed. 1 g of the prepared slurry is taken and placed on the end of the portion having a large pore. The slurry was scratched from the 100 μm portion toward the portion pitted with a small pore using a plate rod and the maximum particle size was determined by reading the pore size at the point where the slurry was no longer scratched.

6. Slurry viscosity

The viscosity of the slurry was measured at room temperature using a Brookfield viscometer DV-I Prime as a measuring instrument.

Preparation Example 1. Preparation of Polymer (A1)

5 g of 2-hydroxyethyl acrylate (HEA, aqueous solubility: about 15%), 1.43 g of acrylic acid (AA, aqueous solubility: 99% or more), 0.71 g of acrylonitrile (AN, aqueous solubility: less than 1%) and 65 g of distilled water were placed in a 100 mL round bottom flask, and the inlet was sealed. The reaction was initiated by bubbling with nitrogen for 30 minutes to remove oxygen, placing the reaction flask in an oil bath heated to 65° C., and then introducing 7 mg of an initiator (VA-65, Wako Chem) and 4 mg of CTA (2-mercaptoethanol) thereto. The reaction was allowed to proceed for about 20 hours or so and then terminated to prepare a random polymer. The conversion rate calculated for the sum of the monomers HEA, AA and AN applied in the above reaction was about 99% or so.

The ratio of AA units, HEA units and AN units in the polymer was about 2:7:1 (AA:HEA:AN) or so and the weight average molecular weight (Mw) was about 260,000 or so.

Preparation Example 2. Preparation of Polymer (A2)

A random polymer was prepared in the same manner as in Preparation Example 1, except that methyl acrylate (MA, aqueous solubility: less than 1%) was used instead of acrylonitrile (AN) as the hydrophobic monomer. The conversion rate calculated for the sum of the monomers applied in the reaction was about 99% or so.

The ratio of AA units, HEA units and MA units in the polymer was about 2:7:1 (AA:HEA:MA) or so and the weight average molecular weight (Mw) was about 240,000 or so.

Preparation Example 3. Preparation of Polymer (A3)

A random copolymer was prepared in the same manner as in Example 1, except that the introduction amounts of the monomers were adjusted (AA: 1.8 g, HEA: 5 g, and AN: 0.36 g) so that the ratio of AA units, HEA units and AN units in the polymer was about 25:70:5 (AA:HEA:AN) or so, and the weight average molecular weight (Mw) of the prepared copolymer was about 280,000 or so.

Preparation Example 4. Preparation of Polymer (A4)

A random copolymer was prepared in the same manner as in Example 1, except that the introduction amounts of the monomers were adjusted (AA: 2.3 g, HEA: 5 g, and AN: 0.38 g) so that the ratio of AA units, HEA units and AN units in the polymer was about 30:65:5 (AA:HEA:AN) or so, and the weight average molecular weight (Mw) of the prepared copolymer was about 220,000 or so.

Preparation Example 5. Preparation of Polymer (B1)

5 g of 2-hydroxyethyl acrylate (HEA, aqueous solubility: about 15%), 2.14 g of acrylic acid (AA, aqueous solubility: 99% or more) and 65 g of distilled water were placed in a 100 mL round bottom flask, and the inlet was sealed. The reaction was initiated by bubbling with nitrogen for 30 minutes to remove oxygen, placing the reaction flask in an oil bath heated to 65° C., and then introducing 7 mg of an initiator (VA-65, Wako Chem) and 4 mg of CTA (2-mercaptoethanol) thereto. The reaction was allowed to proceed for about 20 hours or so and then terminated to prepare a random polymer. The conversion rate calculated for the sum of the monomers applied in the above reaction was about 99% or so.

The ratio of AA units and HEA units in the polymer was about 3:7 (AA:HEA) or so and the weight average molecular weight (Mw) was about 300,000 or so.

Preparation Example 6. Preparation of Binder (B2)

The random copolymer prepared in Preparation Example 5 and polyacrylonitrile were mixed in a weight ratio of 9:1 (random copolymer:polyacrylonitrile) to prepare a binder.

EXAMPLE 1

A negative electrode slurry composition was prepared by mixing the polymer (A1) (binder) prepared in Preparation Example 1, an active material mixture and a conductive material (Super C) in a weight ratio of 4:95:1 (binder:active material mixture:conductive material) and then adding water as a solvent thereto. Here, the active material mixture was a known silicon series mixture, where a mixture was used, in which a carbon active material and a silicon-based active material was mixed in a weight ratio (carbon active material: silicon-based active material) of about 90:10. Thereafter, the slurry was coated on a copper foil current collector having a thickness of about 20 μm to be a thickness of about 100 μm or so after drying and vacuum-dried at about 100° C. for about 10 hours to prepare a negative electrode having a loading amount of about 1.5 mAh/cm² or so.

EXAMPLE 2

A negative electrode was prepared in the same manner as in Example 1, except that the polymer (A2) prepared in Preparation Example 2 was used.

EXAMPLE 3

A negative electrode was prepared in the same manner as in Example 1, except that the polymer (A3) prepared in Preparation Example 3 was used.

EXAMPLE 4

A negative electrode was prepared in the same manner as in Example 1, except that the polymer (A4) prepared in Preparation Example 4 was used.

COMPARATIVE EXAMPLE 1

A negative electrode was prepared in the same manner as in Example 1, except that the polymer (B1) prepared in Preparation Example 5 was used.

COMPARATIVE EXAMPLE 2

A negative electrode was prepared in the same manner as in Example 1, except that the binder (B2) prepared in Preparation Example 6 was used.

The physical properties measured for the above were summarized and described in Table 1 below.

TABLE 1

|  | Example | | | | Comparative Example | |
| --- | --- | --- | --- | --- | --- | --- |
|  | 1 | 2 | 3 | 4 | 1 | 2 |
| Viscosity (cp) | 25000 | 30000 | 20000 | 23000 | 50000 | 70000 |
| Maximum particle size of slurry (μm) | 60 | 72 | 58 | 58 | 100 | more than 100 |
| Adhesive force (gf/cm) | 98 | 75 | 85 | 95 | 47 | 20 |

From Table 1, it can be seen that in the case of Examples, the binder or the active material has a small aggregation upon preparing the slurry, which is expected to be due to the characteristics of the polymer. For example, it is determined that the hydrophobic monomer units contained in the polymer interact with the other parts having high aqueous solubility to enhance the dispersibility. In addition, in the case of Examples, the excellent adhesion properties were also shown.

Through this, it can be confirmed that if the binder of the present application is applied, there is an effect of increasing the dispersibility of the active material while maintaining the adhesive force in the silicon-based negative electrode material, whereby excellent cycle characteristics and the like can be secured.

The invention claimed is:

1. A silicon electrode binder comprising:
a copolymer comprising:
a first monomer unit, wherein a homopolymer of said first monomer unit has a glass transition temperature of 80° C. or higher;
a second monomer unit, wherein a homopolymer of said second monomer unit has a glass transition temperature of 70° C. or lower; and
a third monomer unit, wherein said third monomer unit has an aqueous solubility at room temperature of less than 5%,
wherein the first monomer unit is a carboxyl group-containing monomer unit,
wherein the second monomer unit is a hydroxyl group-containing monomer unit, a polyalkylene oxide unit-containing monomer unit, a phosphite group-containing monomer unit or a ureido group-containing monomer unit,
wherein the third monomer unit is (meth)acrylonitrile unit, a styrene-based monomer unit or alkyl (meth) acrylate unit,
wherein a ratio of the first monomer unit is in a range of 10 weight % to 40 weight % based on a total weight of the copolymer, and
wherein the second monomer unit is comprised in an amount of 100 to 500 parts by weight relative to 100 parts by weight of the first monomer unit.

2. The silicon electrode binder according to claim 1, wherein an aqueous solubility of the copolymer is 5% or more.

3. The silicon electrode binder according to claim 1, wherein the copolymer has a weight average molecular weight in a range of 100,000 to 5,000,000.

4. The silicon electrode binder according to claim 1, wherein the carboxyl group-containing monomer is (meth) acrylic acid, 2-(meth)acryloyloxyacetic acid, 3-(meth)acryloyloxypropylic acid, 4-(meth)acryloyloxybutyric acid, acrylic acid dimer, itaconic acid, maleic acid or maleic anhydride.

5. The silicon electrode binder according to claim 1, wherein the second monomer unit is the hydroxyl group-containing monomer unit, the polyalkylene oxide unit-containing monomer unit or the ureido group-containing monomer unit.

6. The silicon electrode binder according to claim 1, wherein the second monomer unit is contained in a ratio of 150 to 500 parts by weight relative to 100 parts by weight of the first monomer unit.

7. The silicon electrode binder according to claim 1, wherein the third monomer unit is comprised in an amount of 0.1 to 30 parts by weight relative to 100 parts by weight of the first and second monomer units.

8. A silicon electrode binder composition comprising the silicon electrode binder of claim 1.

9. An active material composition comprising the silicon electrode binder of claim 1 and an electrode active material.

10. The active material composition according to claim 9, wherein the electrode active material is a silicon active material.

11. An electrode comprising a current collector, and the silicon electrode binder of claim 1 and an electrode active material, formed on one side of the current collector.

12. The electrode according to claim 11, wherein the electrode active material is a silicon active material.

13. A secondary battery comprising the electrode of claim 11 as a negative electrode.

* * * * *